United States Patent [19]

Kobayakawa et al.

[11] Patent Number: 6,119,078
[45] Date of Patent: Sep. 12, 2000

[54] SYSTEMS, METHODS AND COMPUTER PROGRAM PRODUCTS FOR AUTOMATICALLY TRANSLATING WEB PAGES

[75] Inventors: Takashi Kobayakawa; Eiichi Tazoe; Jun Ishikura, all of Tokyo, Japan

[73] Assignee: International Business Machines Corporation, Armonk, N.Y.

[21] Appl. No.: 08/949,257

[22] Filed: Oct. 13, 1997

[51] Int. Cl.[7] .................................................. G06F 17/28
[52] U.S. Cl. .............................................. 704/3; 709/206
[58] Field of Search .............................. 704/1, 2–8, 9; 707/530, 536; 395/200.36; 709/206

[56] References Cited

U.S. PATENT DOCUMENTS

| 5,175,684 | 12/1992 | Chong .............................................. 704/3 |
| 5,295,068 | 3/1994 | Nishino et al. .............................. 704/2 |
| 5,497,319 | 3/1996 | Chong et al. ................................ 704/2 |
| 5,535,120 | 7/1996 | Chong et al. ................................ 704/2 |
| 5,548,508 | 8/1996 | Nagami ......................................... 704/5 |
| 5,568,383 | 10/1996 | Johnston et al. ............................. 704/2 |
| 5,587,902 | 12/1996 | Kugimiya ..................................... 704/5 |
| 5,715,466 | 2/1998 | Flangan et al. .............................. 704/2 |
| 5,751,957 | 5/1998 | Hiroya et al. ....................... 395/200.33 |
| 5,764,906 | 6/1998 | Edelstein et al. .................. 395/200.49 |
| 5,828,990 | 10/1998 | Nishino et al. .............................. 704/2 |
| 5,884,246 | 3/1999 | Boucher et al. ............................. 704/2 |
| 5,944,790 | 8/1999 | Levy ........................................ 709/218 |
| 5,987,401 | 11/1999 | Trudeau ....................................... 704/2 |

Primary Examiner—Forester W. Isen
Assistant Examiner—Patrick N. Edward
Attorney, Agent, or Firm—Myers Bigel Sibley & Sajovec; A. Bruce Clay

[57] ABSTRACT

A Web page in a first language can be translated into a second language by interpreting the URL used to request the Web page. A character string is located that is similar to at least a portion of the URL. A translating environment is linked to the located character string and automatically translates the Web page transmitted from the server. The translated Web page may be displayed in both the first and second languages.

24 Claims, 7 Drawing Sheets

SYSTEMS, METHODS AND COMPUTER PROGRAM PRODUCTS FOR AUTOMATICALLY TRANSLATING WEB PAGES

FIELD OF THE INVENTION

The present invention relates generally to data processing systems, methods and computer program products, and more particularly to data processing systems, methods and computer program products for translating documents written in foreign languages.

BACKGROUND OF THE INVENTION

The Internet is a worldwide decentralized conglomeration of computer networks. The Internet has gained broad recognition as a viable medium for communicating and interacting across multiple networks. The World Wide Web (hereinafter the "Web") was created in the early 1990's, and is comprised of servers (computers connected to the Internet) having hypertext documents or Web pages stored therewithin. These Web pages are accessible by client devices (hereinafter "clients") using browser programs (hereinafter "browsers") utilizing the Hypertext Transfer Protocol (HTTP) and the Transmission Control Protocol/Internet Protocol (TCP/IP). HTTP treats characters, images, tables, and the like as objects and provides various correlations between objects. Exemplary browsers include Netscape Navigator® (Netscape Communications Corporation, Mountain View, Calif.) and Internet Explorer® (Microsoft Corporation, Redmond, Wash.). Browsers typically provide a graphical user interface for retrieving and viewing Web pages hosted by HTTP servers.

A Web page, using a standard page description language known as HyperText Markup Language (HTML), typically displays text and graphics, and can play sound, animation, and video clips. HTML provides basic document formatting and allows a Web page developer to specify hypertext links (typically manifested as highlighted text) to other servers and files. When a user selects a particular hypertext link, the Web browser reads and interprets the address, called a URL (Uniform Resource Locator) associated with the link, connects the client with the Web server at that address, and makes a TCP/IP request for the Web page identified in the link. The server then sends the requested Web page to the client in HTML format which the browser interprets and displays to the user.

A URL is a standard addressing technique for identifying information resources on the Internet. The specifications for URLs are governed by RFC1738 which is one of the official Request for Comments documents prepared by the Internet Engineering Task Force (IETF). A URL gives the type of resource being accessed (e.g., Gopher, WAIS) and optionally the path of the file sought. For example: resource://host.domain/path/filename, wherein the resource can be "file", "http", "gopher", "WAIS", "news", or "telnet". Through the Web, users can access the various Internet services, including Gopher, Telnet, and FTP.

The World Wide Web has become a popular medium for the exchange of information and for electronic commerce. Literally millions of new Web pages have been developed in the past several years as more and more individuals, businesses and organizations have discovered the power of Internet marketing. Many of these Web pages are written only in English. Non-English speaking users often have difficulty reading Web pages written in English, and thus may be precluded from a large amount of information available on the Internet.

Automatic translation software translates text on Web pages prepared in a foreign language, such as English, into text expressed in a user's native language such as Japanese, or vice versa. Automatic translation software typically utilizes a database that contains information about various languages and a translation engine that refers to this database when performing automatic translation. Utilizing the database, data from a Web page is relayed by the automatic translation software using a Web browser's proxy function. A translated document is retransmitted to the Web browser and displayed on the user's screen. Exemplary automatic translation software of this type is "King of Internet Translation Ver 1.x," sold by IBM Japan, Ltd.

Unfortunately, it can be difficult to automatically translate text in one language to text in another language so that the meaning of the original text is accurately reflected in the translation. This may often be a result of the ambiguity inherent in various languages. For example, ambiguity may arise from the use of words that have many meanings and that frequently appear in the text to be translated. Each time a word having many meanings appears in the text, the translation engine must select a meaning. Having little basis upon which to select a meaning, the word selection may be erroneous. Another source of ambiguity may arise from variations in grammar between different languages. English sentences, for example, have basic structural patterns of subjects, verbs and objects, such as "subject-verb-object." When pronouns such as "that", "which", and "why" are omitted, understanding English sentence patterns and grammar may be difficult.

Multiple translating environments have been employed in order to ensure more accurate automatic translation. A "translating environment" typically includes a dictionary database and grammatical algorithms. Typical algorithms include setups for clauses, setups for auxiliary verb meanings, and various sentence stylistic designations. Portions of text typically must correlate with a translating environment. Similar words that are frequently used when referring to respective fields, such as the arts, sports, education and science, may have differing meanings and usages. Special translating environments, such as an Internet dictionary, an art dictionary, and a sport dictionary, for respective types of uses are typically used within existing translating environments. Translating environments reduce unnecessary analysis during automatic translation and translation accuracy is often enhanced.

A typical method employed for selecting an appropriate translating environment is one where a user manually selects the appropriate translating environment in accordance with the contents of the original text. In this case, a user must understand the contents of the text before automatic translation is run. However, it may be difficult for a user to understand, at a glance, the contents of text written in a language other than his or her native language. Accordingly, the user may spend a lot of time trying to understand the text in order to select the proper translation environment.

Exemplary translating environments and methods are disclosed in Japanese Unexamined Patent Publications No. Hei 7-191999, Hei 6-332946, Hei 6-318229, Hei 6-60117 and Sho 61-173060. Disclosed therein is a translation system that automatically selects a translating environment. A translation system of this type may eliminate the troublesome procedures required when a user selects a translating environment, and it may enhance work efficiency. However, most of the conventional techniques involve some analysis of the text before selecting a translating environment. Unfortunately, such analysis of the text of a Web page may require a considerably long time to complete, and may complicate the translation.

SUMMARY OF THE INVENTION

It is an object of the present invention to provide superior automatic Web page text translations employing a translation system equipped with a plurality of translating environments, to translate foreign language text into native language text.

It is another object of the present invention to provide superior automatic Web page translations wherein an appropriate translating environment for the foreign language text that is to be translated is automatically selected.

It is an additional object of the present invention to provide superior automatic Web page translations wherein multiple translating environments for translating foreign language text into native language text are provided.

These and other objects are accomplished by systems, methods, and computer program products for automatically translating a Web page from a first language to a second language when the Web page is downloaded from a server to a client in communication with the server. A user requests that a Web page be downloaded from a server by transmitting a universal resource locator (URL) to the server. A URL is typically a character string identifying both the Web page and the server in which the Web page is located. The URL is interpreted and a database is searched for a URL or partial URL similar to at least a portion of the transmitted URL.

Each URL or partial URL in the database is associated with a translating environment. Accordingly, when a URL or partial URL is located in the database that is similar to the transmitted URL, the translating environment associated therewith is selected. The Web page transmitted to the client from the server is then translated from the first language to the second language using the selected translating environment. For example, a Web page in Japanese can be translated into English, or vice versa.

The translated Web page is displayed on a client display screen in the second language. The Web page may also be displayed in both the first language and the second language. If the second language is not the correct language, the user may select another translating environment from the database. This translating environment translates the Web page into a third language which may be displayed on the client display screen alone or in combination with either of the previous languages. In addition, a user may link a translating environment with a URL or partial URL and store this link within the database for future access.

The present invention is advantageous because a user is not required to analyze the text of a Web page in order to select the correct translating environment. Since an appropriate translating environment is automatically selected, the accuracy of translations can be enhanced. Furthermore, since the selection of a translating environment and the addition of the environment to the database are performed only for a URL character string, which may be a relatively small amount of data, the translation processing is efficient and expedient.

DETAILED DESCRIPTION OF THE INVENTION

Figure 1:
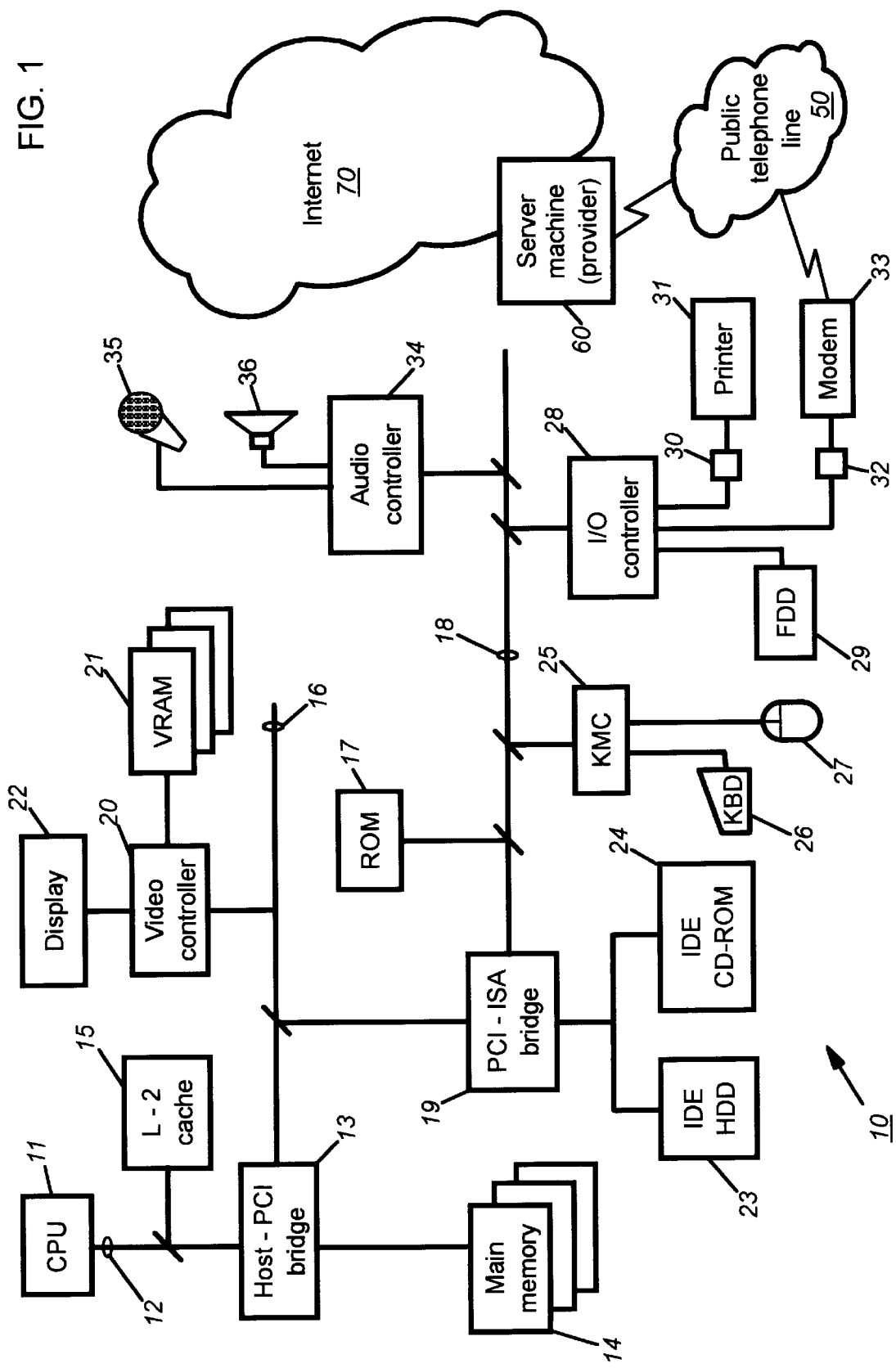
FIG. 1 is a schematic diagram illustrating a hardware arrangement of a computer system according to aspects of the present invention.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

As will be appreciated by one of skill in the art, the present invention may be embodied as a method, data processing system, or computer program product. Accordingly, the present invention may take the form of an entirely hardware embodiment, an entirely software embodiment or an embodiment combining software and hardware aspects. Furthermore, the present invention may take the form of a computer program product on a computer-readable storage medium having computer-readable program code means embodied in the medium. Any suitable computer readable medium may be utilized including hard disks, CD-ROMs, optical storage devices, or magnetic storage devices.

As is understood by those skilled in the art of Web client/server communications, a user accesses a server by establishing a TCP connection between the client and server. For the majority of Internet communications, a client communicates with a server using HTTP protocol over a TCP connection between the client and server. The data transferred between the client and the server are HTTP data objects (e.g. HTML data). A server may be a proxy that receives requests from a number of clients and routes the requests to the appropriate server. A server may also be referred to as an HTTP server.

It is understood that a client or server or other apparatus configured to execute program code embodied within computer usable media, operates as means for performing the various functions and carries out the methods of the various operations of the present invention. It is also understood that the present invention may be used with all client-server communications, and is not limited to specific protocols such as TCP/IP protocol.

As is known by those skilled in the art of Web client/server communications, the functionality of a hypertext document (referred to hereinafter as a "Web page") comes from its ability to link text, images, and other objects within a document to text, images, and objects located elsewhere on the Internet. A Web page can be comprised of text, images and a variety of objects, each of which are surrounded by various tags which control format attributes and identify different portions of the document (for example: <tag_name>text</tag_name>). Web pages are typically written and stored in ASCII text format using a text editor.

HyperText Markup Language uses so-called "markup tags," denoted by the < > symbols, with the actual tag between the brackets. Most markup tags have a beginning tag (<tag>) and an ending tag (</tag>). For example, to make a line of text appear as a heading the following tags enclose the text: <H3></H3>. (<H3>This text appears as a heading.</H3>). To make a line of text appear as a larger heading the following tags enclose the text: <H2></H2>. (<H2>This text appears as a larger heading.</H2>). To make a word or line of text appear in bold the text is enclosed by the tags: <B></B>. (<B>Bold text</B>). In addition there are numerous link tags in HTML to enable the viewer of a Web page to jump to another place in the same page, to jump to a specific place in another Web page, or to create and jump to a remote link (via a new URL) to another Web server. The HTML language is described in the HTML Reference Manual, published by Sandia National Laboratories, and available on the Internet at "http://Web.sandia.gov/sci-compute/html.ref.html", which is incorporated herein by reference, in its entirety. It is to be understood that the terms "tag" and "markup tag" can be used interchangeably.

A "translating environment" includes a dictionary database and grammatical algorithms (e.g., setups for clauses, setups for auxiliary verb meanings, and sentence stylistic designation), which are used for translation processing. The present invention is intended mainly for the automatic translation of Web pages, and is based on the fact that a Web page URL consists of a combination of descriptive character string segments (i.e., "partial URL character strings): a protocol name, a server name and a file name.

The present invention can be implemented via a computer process, which is performed by interlocking with a series of browsing operations for receiving a Web page from a Web server and for displaying it on a browser screen. The computer process includes a translation engine, used for translating foreign language text into native language text (or vice versa), and a plurality of translating environments, such as translating environment A (Internet dictionary), translating environment B (art dictionary), and translating environment C (sports dictionary).

According to an automatic translating method of the present invention, a database for URL character strings is created with a format, such as that illustrated in Table 1. The illustrated database includes URL character strings for Web pages accessed relatively frequently and translating environments associated therewith. The translating environments that correspond to respective URL character strings are regarded as appropriate environments, based on the results obtained by the past performances of the translation process.

TABLE 1

| URL character strings | Translating environments |
| --- | --- |
| Web.ibm.com/ | Translating environment A (Internet dictionary) |
| Web.yahoo.com/ | Translating environment A (Internet dictionary) |
| Web.yahoo.com/Arts/ | Translating environment B (art dictionary) |
| Web.yahoo.com/Arts/Recreation/Sports | Translating environment C (sports dictionary) |

In Table 1, translating environment A (an Internet dictionary) is recorded as an appropriate environment for URL names "Web.ibm.com/" and "Web.yahoo.com/". Translating environment B (an art dictionary) is recorded as an appropriate environment for "Web.yahoo.com/Arts". Translating environment C (a sports dictionary) is recorded as an appropriate environment for "Web.yahoo.com/Arts/Recreation/ Sports/". The database may be prepared in advance based on general user usage tendencies. The database may be expanded further to accomodate the access habits of users.

When a user inputs a URL character string to a Web browser screen, the Web browser (or the proxy of the Web browser) downloads a file from a Web page designated in the URL character string. A computer process according to the present invention interprets the input URL character string. An interpretation of the URL character string refers to a process employed to locate a URL character string that most nearly resembles (i.e., is most analogous to) the input URL character string. More specifically, a URL character string is regarded as a combination of partial URL character strings. A URL character string having the combination of partial URL character strings that most nearly resembles the input URL character string is searched for in the database. When, for example, the input URL is "Web.ibm.com/", which is in the database, the corresponding translating environment A (an Internet dictionary) is automatically selected. If the input URL string is "Web.yahoo.com/Arts/Architecture/", which is not registered in the database, translating environment B (an art dictionary), which corresponds to "Web.yahoo.com/Arts/", whose partial URL character strings most closely resemble the input URL string, is automatically selected. According to the present invention, the URL character string may be interpreted either after a Web page has been downloaded, or in parallel with the downloading. The present invention may include a proxy function for a Web browser to download a Web page.

The translation engine employs the selected translating environment to translate foreign language text in a downloaded file into native language text. The native language text obtained by translation is transmitted to the Web browser and is displayed on a browser screen. An original text window for the original foreign text and a translation window for the native language text may be simultaneously displayed on the same screen. Accordingly, both the original text and its corresponding translated text may be displayed.

If a user determines that the result of translation displayed on the browser screen is not correct, he or she may select another translating environment and perform the automatic translation again. When the appropriate translating environment for an unregistered URL character string is found, that translating environment may be added to the database.

According to the present invention, a translating environment is automatically selected based on a URL character string before automatic translation of the Web page is performed. Since an appropriate translating environment is selected, the accuracy of the translation is enhanced. Since the selection of a translating environment and the addition of the environment to the database are performed only for a URL character string, which is a relatively small amount of data, the processing is fast and efficient.

Hardware Environment

FIG. 1 is a schematic diagram illustrating a hardware arrangement of a computer system 10 appropriate for embodying the present invention. The respective sections will now be described. A central processing unit (CPU) 11, a main controller, executes various programs under the control of an operating system (OS). The CPU 11 may be, for example, a "Pentium/1xx MHz", from Intel Corp. The OS may be, for example, "OS/2", from IBM Corp., or "Windows 95", from Microsoft Corp.

The CPU 11 is mutually connected with hardware blocks via three buses: a processor bus 12 directly connected to an external pin of the CPU 11, a PCI (Peripheral Component Interconnect) bus 16 that serves as a local bus, and an ISA (Industry Standard Architecture) bus 18 that serves as an input/output bus. The processor bus 12 communicates with the PCI bus 16 via a bridge circuit (host-PCI bridge) 13. The bridge circuit 13 in this embodiment includes a memory controller for controlling access to a main memory 14, and a data buffer for absorbing a difference between the speeds of the buses 12 and 16.

The main memory 14 is used as an area where programs are loaded and as a work area for a currently executing program, and is generally constituted by a plurality of DRAM (dynamic RAM) chips. An L2-cache 15, a high-speed memory, is used to temporarily store code/data that are frequently accessed and to absorb the time required for the CPU 11 to access the main memory 14, and is generally constituted by an SRAM (static RAM) chip. A ROM 17 is nonvolatile memory in which are permanently stored a test program (POST), that is executed when the system is powered on, and code groups, that are used to operate respective hardware components of the system 10.

The PCI bus 16 is a bus (which may have a width of 32 bits, an operating frequency of 33 MHz) that enables the high-speed data transfer. The peripheral devices, such as the video controller 20 and a card bus controller (not shown), driven at a relatively high speed are connected to the PCI bus 16.

The video controller 20 is a dedicated controller for the actual processing of image commands issued by the CPU 11. The video controller 20 temporarily stores processed image data in a screen buffer (VRAM) 21, and reads the data from the VRAM 21 and outputs it to a display 22.

The PCI bus 16 and the ISA bus 18 are mutually connected by a bridge circuit (PCI-ISA bridge) 19. The bridge circuit 19 in this embodiment includes a DMA controller, a programmable interrupt controller (PIC), and a programmable interval timer (PIT). The bridge circuit 19 in this embodiment also has an Integrated Drive Electronics (IDE) connector for connecting an external IDE storage device. An IDE hard disk drive (HDD) 23 and an IDE CD-ROM drive 24 are connected to the IDE connector. The above described bridge circuits 13 and 19 conform to the specifications provided by the PCI, and are generally provided in the form of a single chip set. An example chip set is "Triton," sold by Intel Corp.

The ISA bus 18 may have a slower data transfer speed than the PCI bus 16 and is used for the connection of peripheral devices, such as a keyboard/mouse controller (KMC) 25, an I/O controller 28 and an audio controller 34, that are driven at relatively low speeds. The keyboard/mouse controller 25 is a dedicated controller that fetches, as computer data, code input at a keyboard 26 and coordinate values input via a mouse 27.

The I/O controller 28 is a dedicated controller for driving a floppy disk drive (FDD) 29 and for controlling the exchange of parallel or serial data via a parallel port 30 or via a serial port 32. Generally, a printer 31 is connected to the parallel port 30, and a modem 33 is connected to the serial port 32.

The modem 33 is used to exchange data via an analog public telephone line 50. The modem 33 converts digital signals in the computer system 10 into analog signals, transmits the analog signals across a line 50, and converts analog signals received across the line 50 into digital signals and supplies the received and converted analog signals to the computer system 10. The computer system 10 in this embodiment can communicate with a server machine 60 (more specifically, a modem of the server machine 60) via the line 50 by using a dialup connection. The "server machine" is one of the server machines (e.g., a server machine nearest to a user who operates the system 10) owned by a "service provider" who provides the Internet connection service. The server machine 60 is commonly provided on the Internet 70, and performs an IP connection, to the Internet 70, of the computer system 10 that has dialed up the server machine 60. Service providers are, for example, "IBM Internet connection service", by IBM Japan, Ltd., and "BEKKOAME/INTERNET", by Bekkoame Internet.

The audio controller 34 is a dedicated controller for inputting/outputting audio signals. The audio controller 34 fetches as computer data audio signals from a microphone 35, or performs digital/analog (DA) conversion of audio data and outputs the results through a loudspeaker 36.

So-called personal computers that are currently available can adequately function as the computer systems 10 shown in FIG. 1. Many electric circuits, other than those shown in FIG. 1, are required to constitute the computer system 10. Since these components are well known to one having ordinary skill in the art, they are not essential to the subject of the present invention. No explanation for them is given in the specification.

Automatic Translation System

Figure 2:
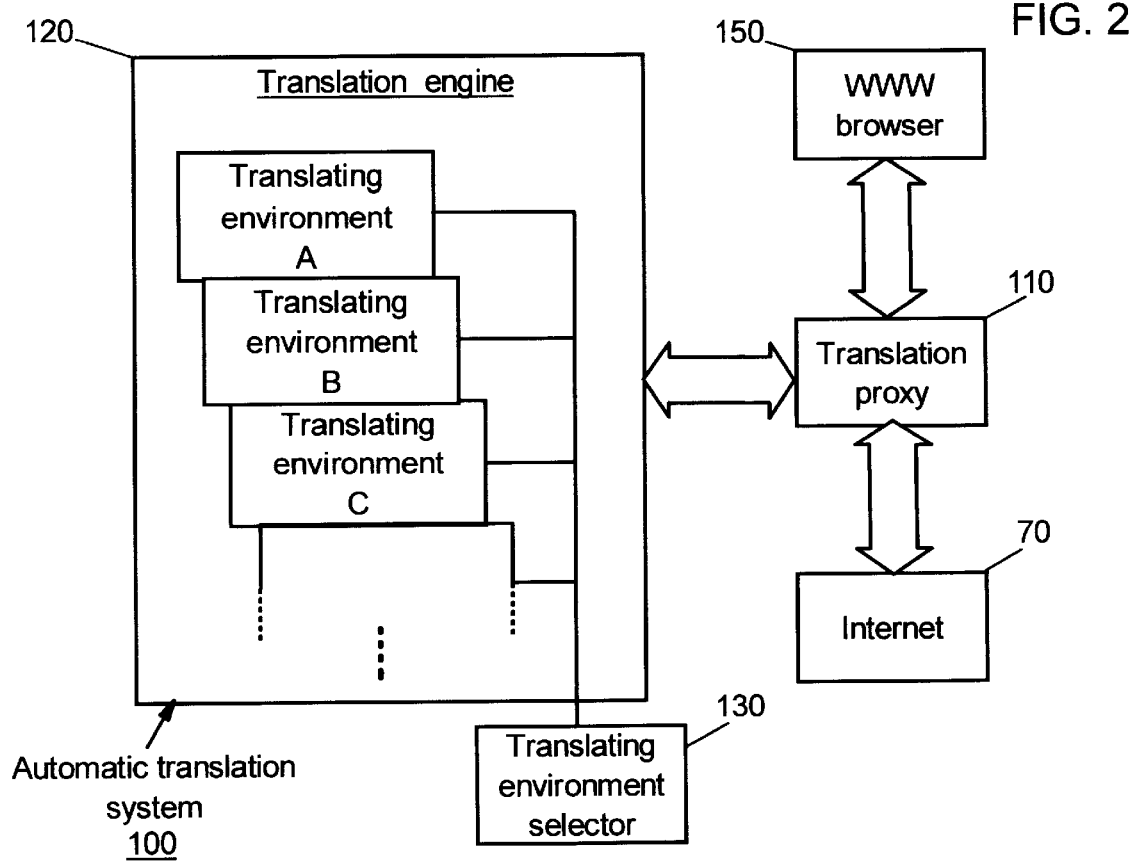
FIG. 2 is a schematic diagram illustrating an automatic translation system according to aspects of the present invention.

FIG. 2 is a schematic diagram illustrating the system configuration of an automatic translation system 100 that embodies the present invention. The automatic translation system 100 is actually implemented as one of the application programs to be run by the computer system 10 shown in FIG. 1. The automatic translation system 100 comprises a translation proxy 110, a translation engine 120 and a translating environment selector 130. These sections and a Web browser 150 interact with each other to preferably perform an automatic translation process according to aspects of the present invention.

The Web browser 150 is a computer program that acts as an Internet tour guide. The Web browser 150 provides a user with a user interface for inputting a URL. Also, the Web browser 150 interprets the contents of an HTML file included in the Web page and displays the result of the interpretation on the display 22. The Web browser 150 in this embodiment has a proxy function. More specifically, the Web browser 150 requests the translation proxy 110 to download a file from a Web page. The Web browser 150 also receives the translation of a text file from the translation proxy 110 and displays it and an image file (e.g., a GIF file) on the display 22. The Web browser 150 supports various display modes, such as "original text only", "translation only" and "both original and translation", and these modes can be selected and deselected on a browser screen. The browser screen may be one window of multiple windows, which will be described later.

Upon a request from the Web browser 150, the translation proxy 110 downloads, via the Internet 70, a file from a Web page designated by the URL, and transmits text in the downloaded file to the translation engine 120. The translation proxy 110 also receives the translation of text from the translation engine 120 and transmits it to the Web browser 150. The "proxy" is an agent for a host that cannot perform a direct outside access, and is the generic term for a relay function, such as the reception of communication data from the Internet.

The translation engine 120 facilitates performing a translation of text in a foreign language to text in a native language. By employing a translating environment, the translation engine 120 translates the original text that has been received from the translation proxy 110, and transmits the translation of the text to the translation proxy 110. The translation engine 120 in this embodiment has a plurality of translating environments, such as translating environment A, translating environment B and translating environment C. A "translating environment" is a dictionary database and grammatical algorithms (e.g., setups for clauses, setups for auxiliary verb meanings, and sentence stylistic designations) that are used for the translation process. As is generally known, there exists correlation between a genre, a field and an application of original text and a translating environment. The present invention provides for various genre a respective special dictionary database, such as an Internet dictionary, a business dictionary, a politics dictionary, an entertainment dictionary, an art dictionary, a sports dictionary, and the like.

The translating environment selector 130 facilitates selection of a translating environment to be used by the translation engine 120. The design of the translating environment selector 130 in this embodiment is based on the fact that a URL consists of a combination of character string segments (i.e., "partial URL character strings") that respectively describe a protocol name, a server name and a file name. The translating environment selector 130 automatically selects an appropriate translating environment in accordance with a URL character string input by the Web browser 150.

Figure 3:
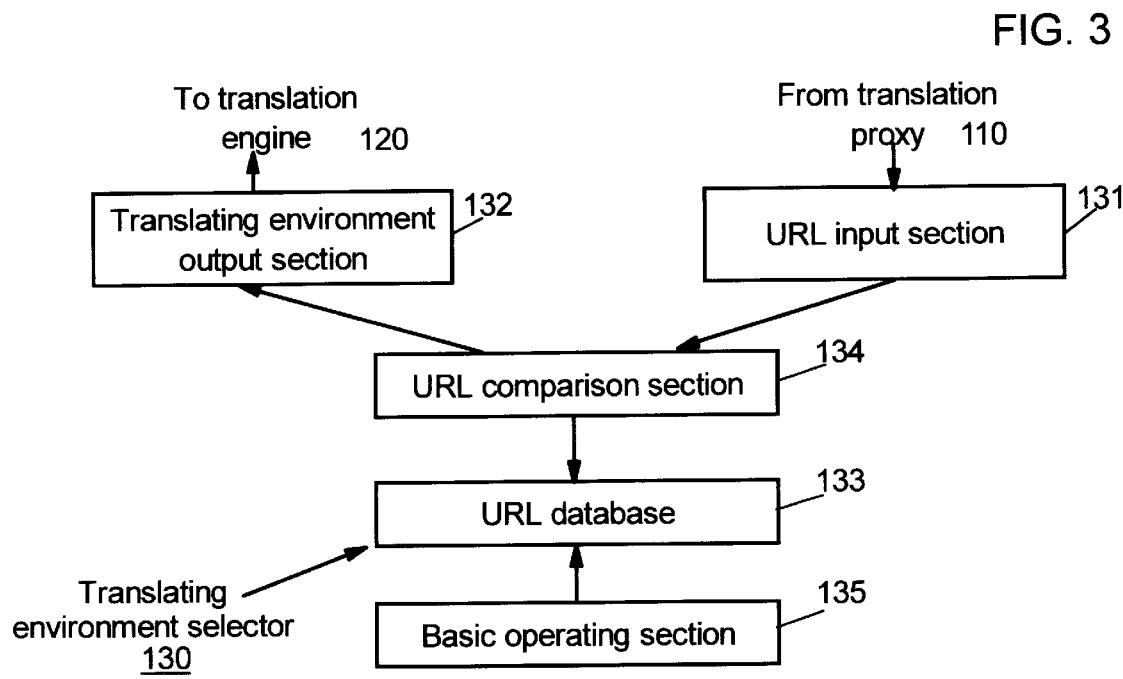
FIG. 3 is a schematic diagram illustrating a translating environment selector.

FIG. 3 is a schematic diagram illustrating an arrangement of the translating environment selector 130. The translating environment selector 130 is subdivided into a URL input section 131, a translating environment output section 132, a URL database 133, a URL comparison section 134, and a basic operating section 135. The URL database 133 is a table which contains URL character strings for Web pages accessed relatively frequently, and a corresponding translating environment for each character string.

Figure 4:
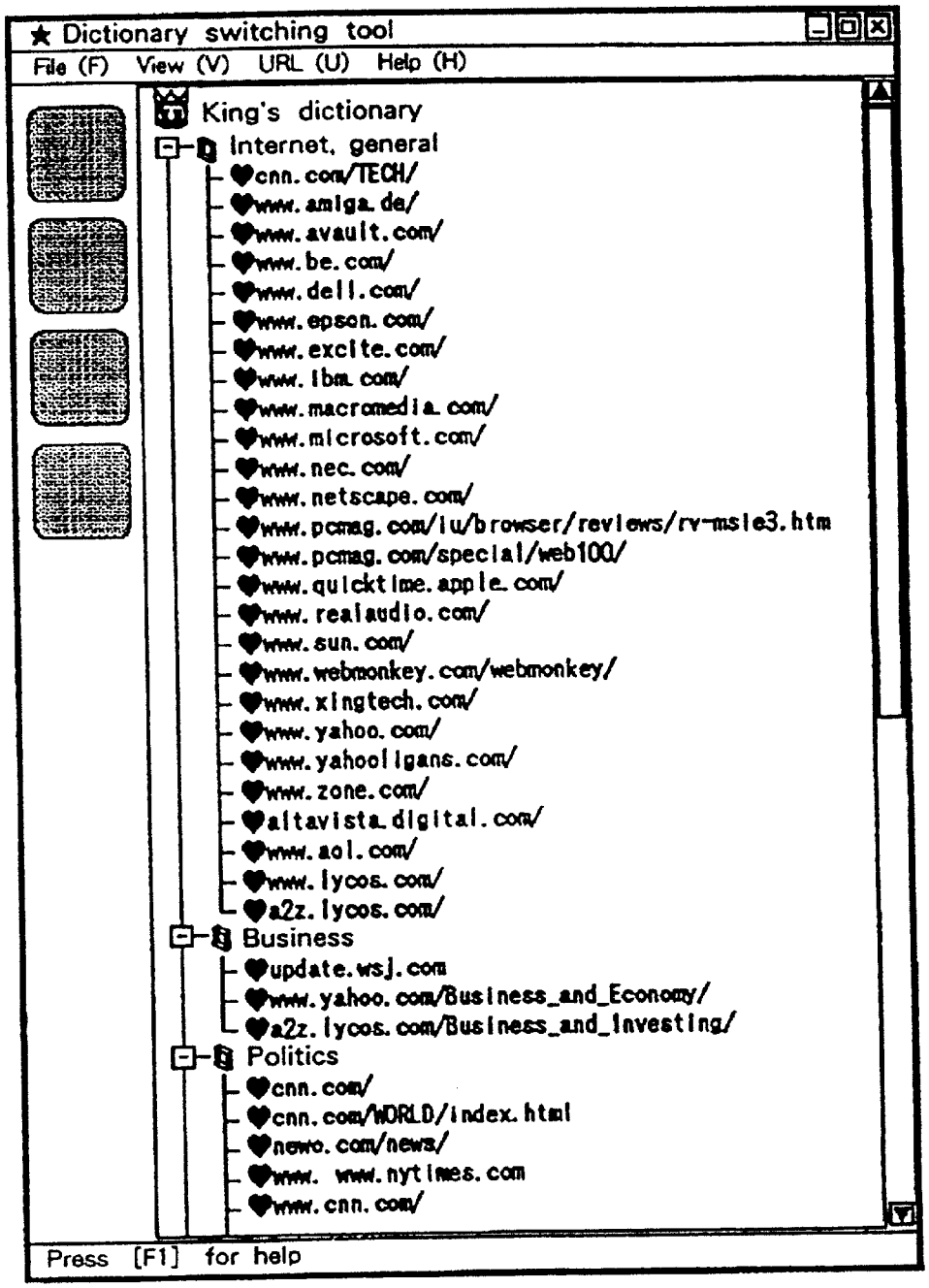
FIG. 4 illustrates a URL database displayed on a Web browser screen.
Figure 5:
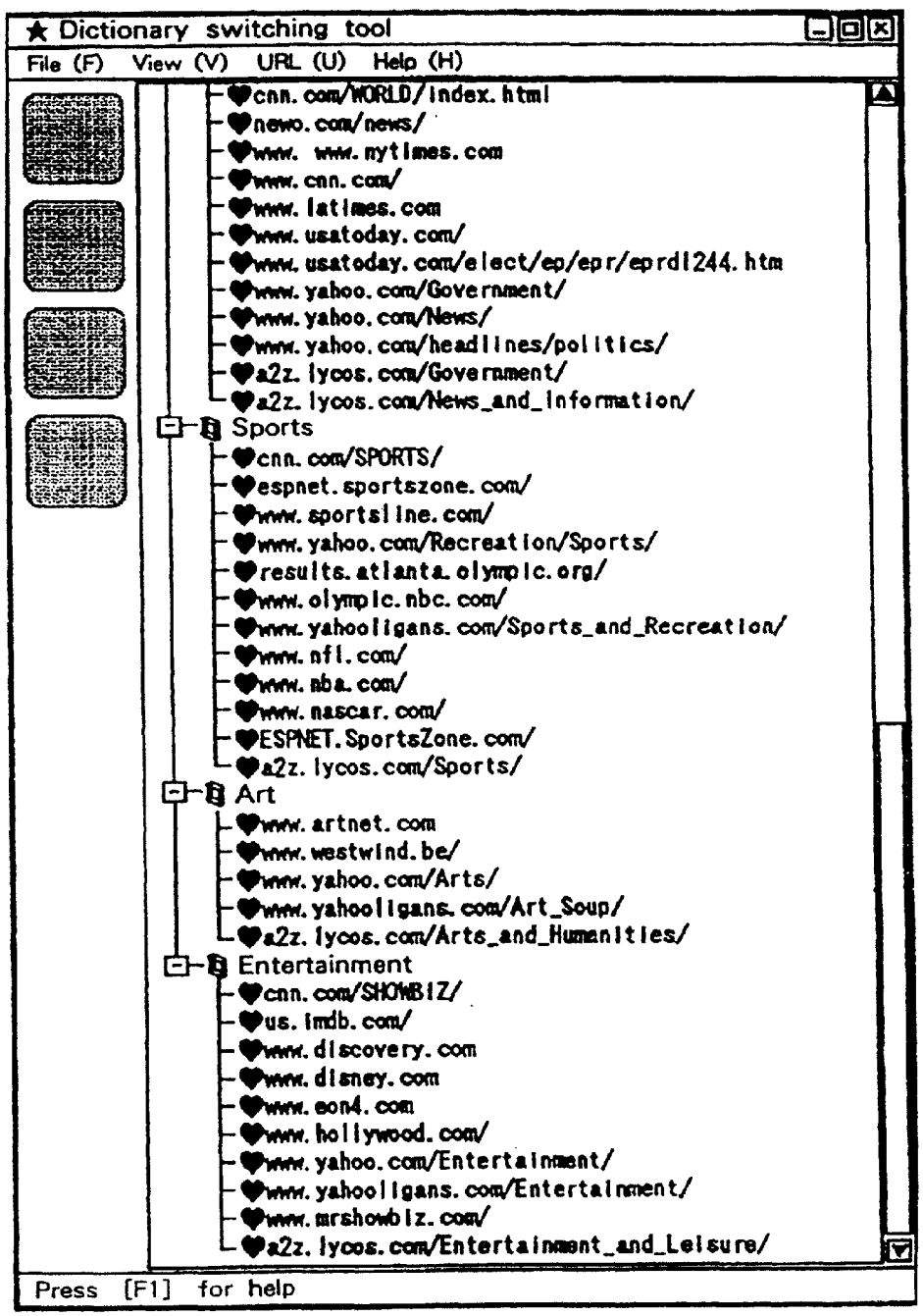
FIG. 5 illustrates a URL database displayed on a Web browser screen (continued from FIG. 4).

Referring now to FIGS. 4 and 5, the URL database 133 displayed on a Web browser screen is illustrated (FIG. 5 is a continuation of the screen in FIG. 4). The URL character strings for Web servers/Web pages accessed frequently are registered in the database 133, in correlation with their appropriate translating environments. For example, "Web.ibm.com/" and "Web.yahoo.com/" are registered in conjunction with their appropriate translating environment "Internet, general", while "cnn.com/" is registered in conjunction with its appropriate environment "politics". In the illustrated URL database 133, the respective character strings are described irregularly (i.e., described only in the order in which they were registered, not in any other order such as alphabetical, partial URL character string arrangement, or string count).

One characteristic point concerning the relationship between a URL character string and its corresponding translating environment is that when the URL character strings describe the same Web server name but the designated files differ, in many cases the appropriate translating environment also differs. As is shown in FIGS. 4 and 5, for example, "Internet, general" is registered as a corresponding environment for "Web.yahoo.com/". However, "politics", "sports" and "art" are registered as appropriate environments for files in the same Web server, "Web.yahoo.com/ Government/", "Web.yahoo.com/Recreation/Sports/," and "Web.yahoo.com/Arts/" respectively. Further, according to an empirical rule originally devised by the present inventors, it was found that even among files in the same Web server, files that have combinations of "partial URL character strings" (character segments divided by a "/" in a character string constituting one URL) that most nearly resemble each other or are most analogous tend to use the same appropriate translating environment. For example, a file designated by URL character string "Web.yahoo.com/Arts/Architecture" has the appropriate translating environment "arts", which is the same as that for "Web.yahoo.com/Arts/", whose partial URL character strings more nearly resemble than those of "Web.yahoo.com/".

A user of the automatic translation system 100 may register in advance URL character strings in the URL database 133. In addition, a user of the system 100 may also register the URL character strings via the basic operating section 135, which will be described later.

The URL input section 131 receives, via the translation proxy 110, a URL character string that is input on the Web browser screen, and transmits it to the URL comparison section 134. The URL comparison section 134 performs a comparison process for the input URL character string on the URL database 133, and finds an appropriate translating environment. The URL comparison section 134 reports the comparison result to the translation engine 120 through the translating environment output section 132.

Selection of Translating Environment

Figure 6:
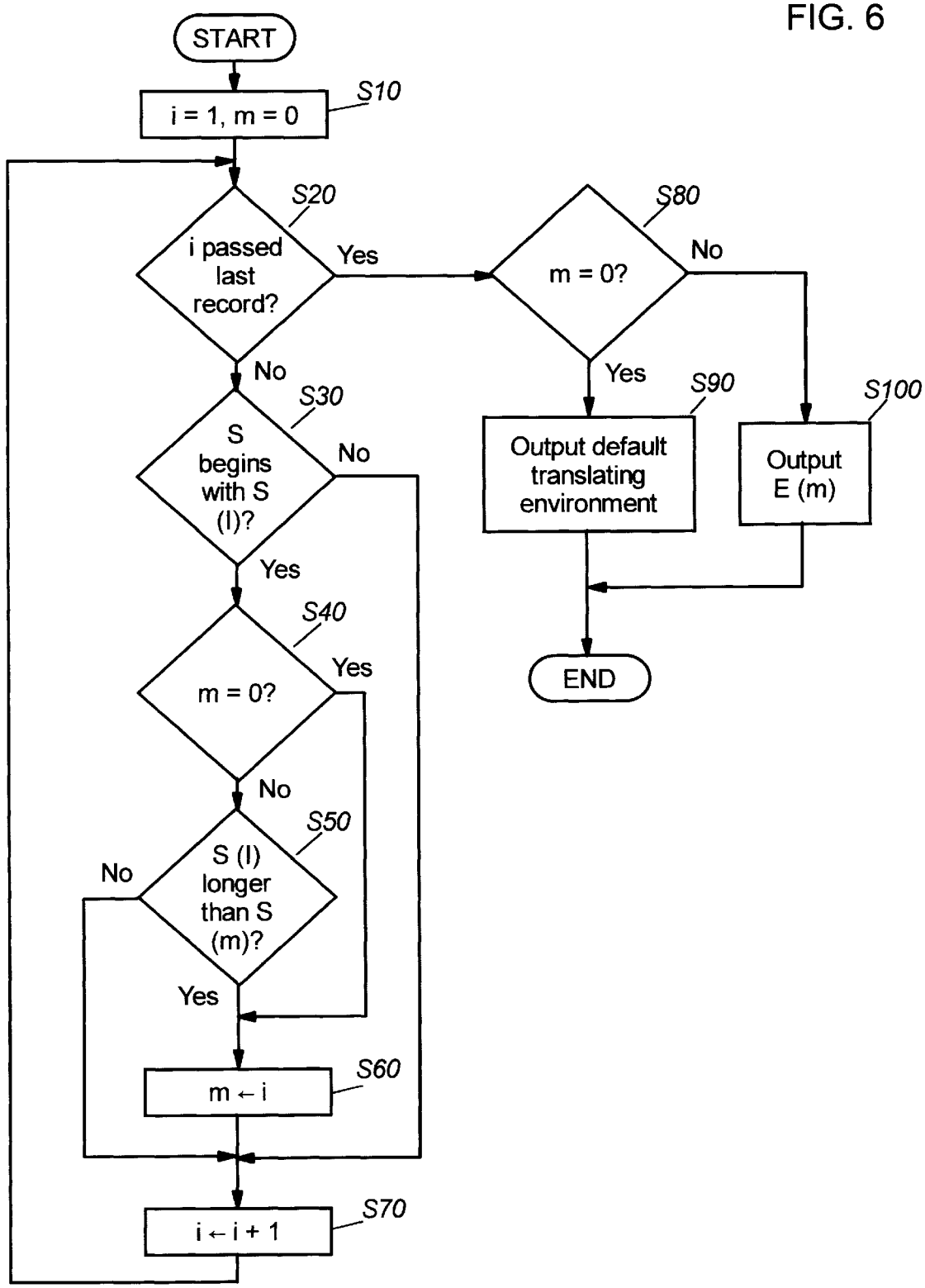
FIG. 6 is a flowchart illustrating operations performed by a URL comparison section when selecting a translating environment.

The URL comparison section 134 searches the URL database 133 for a URL character string that is similar to (i.e., most nearly resembles) an input URL character string, and outputs to the translation engine 120 a translating environment that corresponds to the obtained URL character string. FIG. 6 is a flowchart for a routine performed by the URL comparison section 134 when selecting a translating environment. In this routine, S denotes a URL character string input by the Web browser, i denotes an index on the URL database 133, and m denotes an index for the URL character string obtained during the search process that S most nearly resembles. S(i), for example, represents a URL character string that is registered in the i-th record in the URL database 133. When the final result obtained by the database search is m=M, it means that the appropriate translating environment is the one that corresponds to the M-th URL character string S(M) in the URL database 133. E(m) represents a translating environment for a URL character string that is registered in the m-th record in the URL database 133.

In this routine, first, an initial value is entered in each index (block S10). The initial value for index i is 1, which represents a first record in the URL database 133. The initial value for index m is 0 which indicates that a similar URL character string has not yet been found. At block S20, a check is performed to determine whether or not the value held by current index i has exceeded the count for the last record in the URL database 133.

When the result obtained at decision block S20 is negative, (i.e., when an uncompared record remains in the URL database 133), at block S30 a check is performed to determine whether or not the currently input URL character string S includes, as a partial URL character string, URL character string S(i) for the i-th record.

When the result obtained at decision block S30 is negative (i.e., when the URL character string S(i) does not resemble the currently input URL character string S), program control jumps to block S70. At block S70, i is incremented by one in order to compare the next record in the URL database 133 with the current URL character string S. Program control thereafter returns to block S20.

When the result obtained at decision block S30 is affirmative (i.e., when the URL character string S(i) resembles the currently input URL character string S), program control jumps to block S40. At block S40, a check is performed to determine whether m=0 (i.e., whether a similar URL character string has not yet been found). When m=0, i is substituted into m in order to temporarily store the URL character string used for comparison.

If, at decision block S40, m≠0 (i.e., if a similar URL character string has already been temporarily stored), program control moves to block S50. At block S50, the URL character S(i) that is currently being used for comparison is compared with the URL character string S(m) already stored to determine whether the URL character string more nearly resembles the currently input URL character string S. This determination is performed by comparing the URL character strings S(i) and S(m) to decide which has a greater number of sequential partial URL character strings. For "Web.yahoo.com/" and "Web.yahoo.com/Arts/", since the former consists of one partial URL character string and the latter consists of two, the latter is superior.

The phrase "a greater number of sequential partial URL character strings" means that even when more partial URL character strings correspond to each other, unless the arrangement of the partial URL character strings do not match, the similarity is low as the result of the URL comparison. Assume that a currently input URL character string is "Web.yahoo.com/ Recreation/Sports/" and two URL character strings, "Web.yahoo.com/Sports/" and "Web.yahoo.com/Recreation/" are registered in the URL database 133. Although the latter have two sequential partial URL character strings that match those of the input URL character string, the former has only one partial URL character string that matches that of the input URL character string (although "Sports" is included in the input URL character string, it does not count because the arrangements do not correspond to each other). Therefore, the latter URL character string is superior.

When, at decision block S50, it is ascertained that the newly compared URL character string S(i) is better, at block S60, i is substituted into m in order to change the most analogous URL character string. Then, program control goes to block S70. If, at decision block S50, the URL character string S(m) previously stored is better, program control skips block S60, to maintain the current value for m, and goes to block S70.

At block S70, i is incremented by one to compare the next record in the URL database 133, and program control thereafter returns to block S20. If, at block S20, an uncompared record remains in the URL database 133, the process at blocks S30 through S70 is repeated. When, at block S20, it is ascertained that the value held by current index i has exceeded the count for the last record in the URL database 133, program control branches to "Yes" and goes to block S80.

At block S80, a check is performed to determine whether m=0. When m=0, it means that, at the loop S20 through S70, a URL character string that resembles the currently input URL character string S has not been found in the URL database 133. In this case, a default translating environment is output to the translation engine 120 (block S90), and the routine for selecting a translating environment is terminated.

If m≠0, the translating environment E(m) for the URL character string regarded as most analogous at the loop S20 through S70 is output to the translation engine 120 (block S100). The routine for selecting a translating environment is thereafter terminated. The translation engine 120 employs the selected translating environment E(m) to translate a downloaded file.

Updating URL Database

Figure 8:
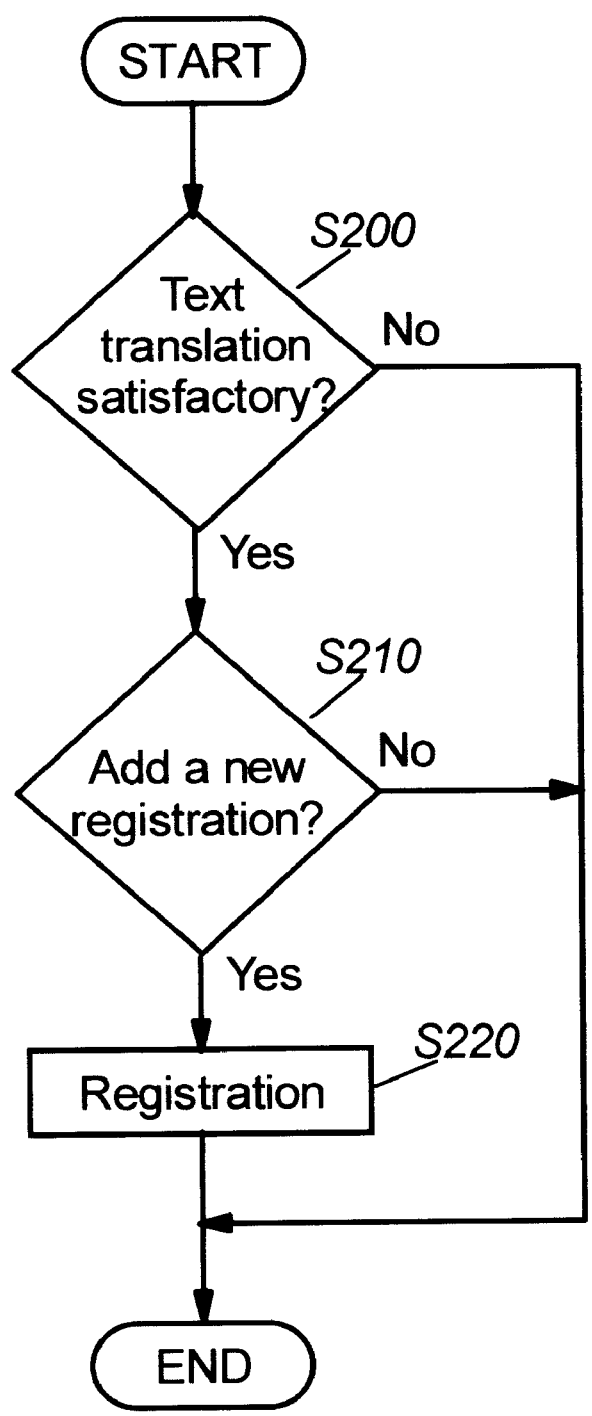
FIG. 8 is a flowchart illustrating operations for adding a registration to a URL database.

As was previously described, the contents of the URL database 133 are additionally registered via the basic operating section 135. FIG. 8 is a flowchart schematically illustrating operations for adding a new registration to the URL database 133. First, a translation of text is displayed on the Web browser screen to ask a user whether the translation is satisfactory, i.e., whether an appropriate translating environment has been selected (block S200). When the result obtained at decision block S200 is negative, adding a registration is not required, and all of the following operations are skipped. The routine is thereafter terminated.

If the result obtained at decision block S200 is affirmative, a user is asked whether the relationship between a newly input URL character string S and its appropriate translating environment E(m) should be added to the URL database 133 (block S210). The user refers to the frequency in the future of the newly input URL character string S to determine whether to perform the registration.

If the result obtained at decision block S210 is affirmative, that relationship is registered in the URL database 133 (block S220). The routine is thereafter terminated. If the result obtained at decision block S210 is negative, program control skips block S220 and terminates the routine.

Browser Screen

Figure 7:
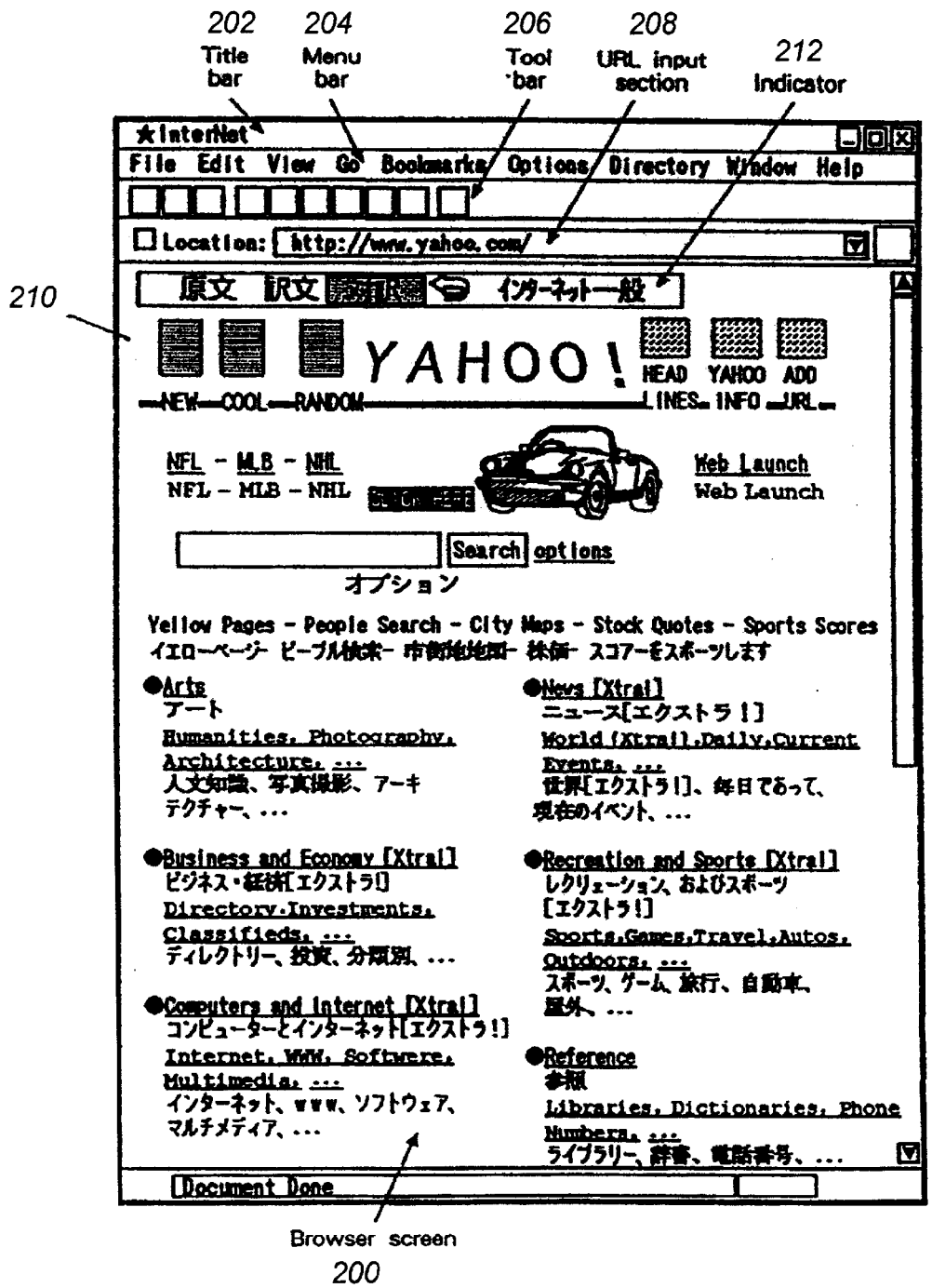
FIG. 7 illustrates an exemplary screen for a Web browser, to which the automatic translation system of the present invention may be attached.

Referring now to FIG. 7, a screen 200 of a Web browser 150 to which the automatic translation system 100 of the present invention may be attached is illustrated. The screen 200 in FIG. 7 is in an "original and translation display" mode in which translated text is shown immediately under the original text. This mode can be switched to another mode, "original only" or "translation only", on the Web browser screen. The Web browser screen may be one window of multiple windows on the display 22.

Reading from the top of the screen 200, a title bar 202, a menu bar 204, and a tool bar 206 are provided on the Web browser screen. As is well known, the title bar 202 is an area in which is displayed the name of an application to be activated for a screen, and the menu bar 204 is an area in which is displayed a list of commands that can be selected. Also well known is that the tool bar 206 is one type of menu bar in which are arranged buttons for quickly activating functions frequently used. These buttons are also called "smart icons".

A URL input portion 208 is provided immediately under the tool bar 206. A user can enter a URL character string in the URL input portion 208 to designate a desired Web page to be accessed. In FIG. 7, URL name "Web.yahoo.com/" is input. The input URL character string is transmitted to the translation proxy 110. The translation proxy 110, which takes the place of the Web browser 150, downloads a designated Web page and temporarily transmits the original text in the Web page to the translation engine 120. The input URL character string is transmitted to the translating environment selector 130 via the translation proxy 110. The translating environment selector 130 interprets the received URL character string and selects for it an appropriate translating environment, which is reported to the translation engine 120. The translation engine 120 employs the selected translating environment to translate original text and transmits the original text and the translated text to the Web browser 150 via the translation proxy 110. This processing sequence may be performed in the background of a desktop.

A rectangular area 210, below the URL input section, that occupies most of the browser screen is the main body of the Web browser screen, and in which the contents of a downloaded Web page are displayed. In FIG. 7, the Web page designated by the URL "Web.yahoo.com/" is displayed on the screen.

At the uppermost level of the main body of the Web browser screen is provided an indicator 212 for displaying a current display mode and a selected translating environment. In FIG. 7, "original and translation" mode is highlighted as a display mode, and therefore, translated text is displayed immediately under the original text on the screen. Since, as is shown in FIG. 4, "Internet, general" is registered as the appropriate environment for "Web.yahoo.com/" in the URL database 133, a message to that effect is displayed in the indicator 212. A user can dynamically change a display mode and an employed translating environment by clicking on the indicator 212 with a mouse 27.

The present invention has been described in detail while referring to a specific embodiment. However, it should be understood that various modifications or revisions of the embodiment are possible within the scope of the present invention. For example, the automatic translation system is not limited to a system that uses the proxy function of a Web browser, but may be a system that receives original text on a Web browser screen via a clip board and then translates it.

As is described above in detail, according to the present invention, provided are superior automatic translating systems, methods, and computer program products for translating Web pages from a first language such as English to a second language such as Japanese.

Further, according to the present invention, provided are a superior automatic translating method and a machine that, before translating foreign language text into native language text, automatically selects an appropriate translating environment for the foreign language text to be translated.

It will be understood that each block of the flowchart illustrations, and combinations of blocks in the flowchart illustrations, can be implemented by computer program instructions. These program instructions may be provided to a processor to produce a machine, such that the instructions which execute on the processor create means for implementing the functions specified in the flowchart block or blocks. The computer program instructions may be executed by a processor to cause a series of operational steps to be performed by the processor to produce a computer implemented process such that the instructions which execute on the processor provide steps for implementing the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based systems which perform the specified functions or steps, or combinations of special purpose hardware and computer instructions.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. A method of automatically translating a requested Web page from a first language to a second language, wherein the requested web page is stored within a server remotely located from a client requesting the Web page and wherein the requested Web page is configured to be displayed in a first language by the requesting client, the method comprising the steps of:

transmitting a request for the Web page from the client to the server via a communications network, wherein the Web page request comprises a universal resource locator that identifies a path to the Web page on the server, and wherein at least a portion of the universal resource locator is associated with a translating environment;

identifying a translating environment associated with the transmitted universal resource locator;

selecting the identified translating environment from a plurality of translating environments; and translating the requested Web page from the first language to the second language using the selected translating environment prior to serving the requested Web page to the requesting client.

2. A method according to claim 1 wherein the at least one portion of the universal resource locator associated with the translating environment comprises at least one character string.

3. A method according to claim 1 further comprising the step of displaying on a client display screen the requested Web page in the second language.

4. A method according to claim 3 further comprising the step of displaying on the client display screen the requested Web page in both the first and second languages.

5. A method according to claim 1 wherein the step of identifying the universal resource locator comprises the step of locating a stored character string similar to the at least one portion of the universal resource locator associated with a translating environment.

6. A method according to claim 3 wherein the step of selecting the identified translating environment comprises the step of selecting a translating environment linked to the stored character string.

7. A method according to claim 1 further comprising the steps of:

selecting a second translating environment;

translating the requested Web page from the second language to a third language using the second translating environment; and displaying the requested Web page on the client display screen in the third language.

8. A method according to claim 7 further comprising the step of establishing a link between the transmitted universal resource locator and the selected third translating environment.

9. A data processing system for automatically translating a requested Web page from a first language to a second language, wherein the requested web page is stored within a server remotely located from a client requesting the Web page and wherein the Web page is configured to be displayed in a first language by the requesting client, comprising:

means for transmitting a request for the Web page from the client to the server via a communications network, wherein the Web page request comprises a universal resource locator that identifies a path to the Web page on the server, and wherein at least a portion of the universal resource locator is associated with a translating environment;

means for identifying a translating environment associated with the transmitted universal resource locator;

means for selecting the identified translating environment from a plurality of translating environments; and means for translating the requested Web page from the first language to the second language using the selected translating environment prior to serving the requested Web page to the requesting client.

10. A data processing system according to claim 9 wherein the at least one portion of the universal resource locator associated with the translating environment comprises at least one character string.

11. A data processing system according to claim 9 further comprising means for displaying on a client display screen the requested Web page in the second language.

12. A data processing system according to claim 11 further comprising means for displaying on the client display screen the requested Web page in both the first and second languages.

13. A data processing system according to claim 9 wherein the means for identifying the universal resource locator comprises means for locating a stored character string similar to the at least one portion of the universal resource locator associated with a translating environment.

14. A data processing system according to claim 13 wherein the means for selecting the identified translating environment comprises means for selecting a translating environment linked to the stored character string.

15. A data processing system according to claim 9 further comprising:

means for selecting a second translating environment;

means, responsive to the selecting means, for translating the requested Web page from the second language to a third language using the second translating environment; and means for displaying the requested Web page on the client display screen in the third language.

16. A data processing system according to claim 15 further comprising means for establishing a link between the transmitted universal resource locator and the selected third translating environment.

17. A computer program product for automatically translating a requested Web page from a first language to a second language, wherein the requested web page is stored within a server remotely located from a client requesting the Web page and wherein the Web page is configured to be displayed in a first language by the requesting client, comprising:

a computer usable medium having computer readable program code means embodied in said medium for transmitting a request for the Web page from the client to the server via a communications network, wherein the Web page request comprises a universal resource locator that identifies a path to the Web page on the server, and wherein at least a portion of the universal resource locator is associated with a translating environment;

computer readable program code means embodied in said medium for identifying a translating environment associated with the transmitted universal resource locator;

computer readable program code means embodied in said medium for selecting the identified translating environment from a plurality of translating environments; and computer readable program code means embodied in said medium for translating the requested Web page from the first language to the second language using the selected translating environment prior to serving the requested Web page to the requesting client.

18. A computer program product according to claim 17 wherein the at least one portion of the universal resource locator associated with the translating environment comprises at least one character string.

19. A computer program product according to claim 17 further comprising computer readable program code means embodied in said medium for displaying on a client display screen the requested Web page in the second language.

20. A computer program product according to claim 17 further comprising computer readable program code means embodied in said medium for displaying on the client display screen the requested Web page in both the first and second languages.

21. A computer program product according to claim 17 wherein the computer readable program code means embodied in said medium for identifying the universal resource locator comprises computer readable program code means for locating a stored character string similar to the at least one portion of the universal resource locator associated with a translating environment.

22. A computer program product according to claim 21 wherein the computer readable program code means embodied in the medium for selecting the identified translating environment comprises computer readable program code means for selecting a translating environment linked to the stored character string.

23. A computer program product according to claim 21 further comprising:

computer readable program code means embodied in the medium for selecting a second translating environment;

computer readable program code means embodied in the medium, responsive to the selecting means, for translating the requested Web page from the second language to a third language using the second translating environment; and computer readable program code means embodied in the medium for displaying the requested Web page on the client display screen in the third language.

24. A computer program product according to claim 23 further comprising computer readable program code means embodied in the medium for establishing a link between the transmitted universal resource locator and the selected third translating environment.

* * * * *

UNITED STATES PATENT AND TRADEMARK OFFICE
CERTIFICATE OF CORRECTION

PATENT NO.    : 6,119,078

DATED         : September 12, 2000

INVENTOR(S)   : Kobayakawa et al.

It is certified that error appears in the above-identified patent and that said Letters Patent is hereby corrected as shown below:

At column 16, line 31, please delete "17" and substitute – 19 – therefore.

Signed and Sealed this

First Day of May, 2001

Attest:

NICHOLAS P. GODICI

Attesting Officer    Acting Director of the United States Patent and Trademark Office